United States Patent

[11] 3,560,725

[72] Inventors William E. Claxton
Mogadore;
Harold C. Holden, Manchester, Ohio
[21] Appl. No. 729,601
[22] Filed May 16, 1968
[45] Patented Feb. 2, 1971
[73] Assignee The Firestone Tire & Rubber Company
Akron, Ohio
a corporation of Ohio

[54] BLEND OPTIMIZER COMPRISING AN ASSEMBLY OF VARIABLE FACTOR POTENTIOMETERS
9 Claims, 9 Drawing Figs.

[52] U.S. Cl. .................................................... 235/193,
235/184, 235/194
[51] Int. Cl. .................................................... G06g 7/16
[50] Field of Search ............,.................................. 235/193,
184, 150.1, 194, 195, 196, 151.12

[56] References Cited
UNITED STATES PATENTS

| | | | |
|---|---|---|---|
| 3,018,050 | 1/1962 | Barrell........................... | 235/193 |
| 3,063,637 | 11/1962 | Burhans ....................... | 235/184 |
| 3,270,190 | 8/1966 | Lambert....................... | 235/194 |
| 3,329,808 | 7/1967 | Fisher............................ | 235/193 |
| 3,406,281 | 10/1968 | Buchanan et al. ............ | 235/193 |

Primary Examiner—Malcolm A. Morrison
Assistant Examiner—Joseph F. Ruggiero
Attorneys—S. M. Clark and Willard L. G. Pollard ABSTRACT: A special purpose analogue computer designed for optimization of the ingredient levels of a rubber compound. The physical characteristics of a particular rubber blend may be closely approximated by a general empirical model equation expressed in second order terms of the ingredients. By analysis of raw experimental data relating to the physical characteristics of interest, a different set of influence coefficients for the general equation terms may be determined for each physical characteristic, whereby a number of special model equations are obtained. In the preferred embodiment of the invention an eight channel analogue system is provided for simultaneously evaluating eight special model equations, expressed in terms of five ingredients. The set of influence coefficients for the terms of each special model equation are scaled to values less than unity and are dialed upon a separate bank of potentiometers of the analogue computer. The desired values of the ingredients are set upon five variable factor dials which may be altered to simulate various combinations of ingredients. The analogue computer then instantly computes eight outputs which represent the values the eight physical characteristics would assume for the selected blend of ingredients. A four oscilloscope read out is provided utilizing the eight outputs and is programmed so that an ideal blend results in the convergence of the four oscilloscope beams toward the center of the readout array.

INVENTORS
WILLIAM E. CLAXTON
HAROLD C. HOLDEN

BY

ATTORNEY

INVENTORS
WILLIAM E. CLAXTON
HAROLD C. HOLDEN

BY

ATTORNEY

Fig. 3.

INVENTORS
WILLIAM E. CLAXTON
HAROLD C. HOLDEN
BY

ATTORNEY fig. 4.

3,560,725

BLEND OPTIMIZER COMPRISING AN ASSEMBLY OF VARIABLE FACTOR POTENTIOMETERS

BACKGROUND OF THE INVENTION

The present invention relates to a special purpose analogue computer for use in design investigations involving variable factor systems. Within the rubber industry such plural factor design investigations have been performed at least in the areas of compounding, textiles, polymerization, and tire wear and noise analysis.

Particularly in the design of rubber compounds great difficulty has been encountered in the speedy determination of optimum ingredient blends, capable of yielding suitable physical characteristics while yielding minimum cost and production time factors. Some compounding problems arise directly from the relatively large number of ingredients in the typical blend and/or from the high criticality of the ingredients. Thus many service compounds now contain seven, eight or even a larger number of basic ingredients. Slight variations in the levels of some of the ingredients may evoke drastic changes in the physical characteristics of the rubber product or in the cost and time factors involved in its production.

Other perhaps more sever difficulties in designing or analyzing a rubber blend arise from interactions between the various ingredients. Thus, the final effect upon the physical characteristics of a blend caused by a variation in the level of one ingredient may in turn depend upon the level of a second ingredient contained in the blend. Clearly any analysis of data relating to test results of compounding experiments is greatly complicated by such interaction effects.

Older methods for designing rubber compounds attempted to overcome the above problems through the use of a large number of experiments. Thus, a rubber blend under study was repeatedly compounded and tested, with the level of only one ingredient being changed at a time. The increments of change were made small and the changes in the ingredient were plotted against the results of test measurements on the physical characteristics or responses of interest. If a large number of experiments were performed and sufficient data accumulated and analyzed, a near optimum compound design could be determined. However, the obvious time involvement and inefficiency of such methods caused the compounder to attempt other approaches, which led to the development of the present invention.

Problems similar to those outlined above have generally plagued the designer studying other plural variable systems within the rubber industry, as well as in other industries as diverse as agriculture and petroleum. Consequently design studies performed in these areas are also susceptible of solution by using the invention described herein.

SUMMARY OF THE INVENTION

The present invention relates to a special purpose analogue computer designed for the evaluation of statistically designed equations which have become increasingly popular as an aid to optimization in the rubber industry as well as in other technical areas. The basic techniques utilized in carrying out designed experiments depend upon setting up special model equations which will closely approximate the behavior of the responses of interest in terms of the factors under study. With respect to rubber compounding it should be apparent that the factors under study would be the ingredients in the blend; while the responses of interest would be physical characteristics such as ultimate elongations, modulus, running temperature, per cent steel ball rebound, ring tearing resistance and chipping severity, or production characteristics relating to cost and production time.

It has been determined that all the physical properties of a rubber blend may be closely approximated by a general empirical model equation of second order terms. Such as equation of the physical property or response $Y_A$ in terms of two ingredients or variable factors $x_1$, $x_2$ would take the form $$Y_A = a_0 + a_1 x_1 + a_2 x_2 + a_{11} x_1^2 + a_{22} x_2^2 + a_{12} x_1 x_2 \quad (1)$$

where $a_0, a_1, a_2, a_{11}, a_{22}$ and $a_{12}$ represent influence coefficients which are unique and constant for the response $Y_A$.

It is possible to establish the numerical values of the influence coefficients by known techniques, for example by the analysis of raw data relating to the physical characteristic $Y_A$ measured for various values of $x_1$ and $x_2$, utilizing a general purpose digital computer. Once the influence coefficients have been determined, use of the special purpose analogue computer of the present invention enables the solution of the special model equation (1) to instantly evaluate $Y_A$ for any desired values of $x_1$ and $x_2$.

The analogue computer of the present invention generally comprises an assembly of variable factor potentiometers which receive reference voltages as inputs and are interconnected with an array of influence coefficient potentiometers to develop a plurality of proportional output currents corresponding, respectively, to the terms of the special model equation. These individual currents are collected by switching circuits on positive and negative buses and summed by a pair of amplifiers to produce an output current proportional to the value of $Y_A$. Thus, any special model equation may be solved merely by scaling its influence coefficients to values less than one and entering them directly on the dials of the appropriate coefficient potentiometers; and then by manipulating the dials of the variable factor potentiometers to the desired levels of $x_1$ and $x_2$ whereupon the special model equation is instantly evaluated in terms of the response under consideration.

Generally a well-known range of values of interest are known for each variable factor. The center of this design range is usually taken as a normal condition and factor levels are measured in positive increments above and negative increments below the center level. Thus in setting up a model equation on the blend optimizer of the present invention the variable factors may take either positive or negative values. This is accounted for in the blend optimizer by providing both positive and negative reference potentials and manually controlled switches to selectively connect a voltage of the proper input polarity to the instant variable factor potentiometer. It should also be apparent that an equal mathematical probability exists that any one influence coefficient will be positive or negative. The negative influence coefficients are accounted for in the blend optimizer by manually controlled switches which automatically collect the positive coefficient terms on a positive amplifier bus and the negative coefficient terms on a negative amplifier bus.

The preferred embodiment of the analogue computer of the present invention is designed to evaluate second order functions in terms of as many as five variable factors and has eight channels to simultaneously accommodate as many as eight special model equations representing eight responses designed in terms of the five variable factors. However, the teaching of the present invention is not limited to the above configuration. Rather, by following the teaching of the present invention, it would be easily possible to construct an accurate and efficient special purpose analogue computer capable of simultaneously evaluating up to 16 special model equations expressed in terms of up to 10 variable factors.

BRIEF DESCRIPTION OF THE DRAWINGS

For a better understanding of the present invention, together with further purposes and objects thereof, reference is made to the following disclosure and appended claims in connection with the accompanying drawings in which:

DETAILED DESCRIPTION OF THE INVENTION

The preferred embodiment of the invention is a special purpose analogue computer capable of evaluating equations expressed as a function of five variable factors. Consequently it is important to consider that the special second order model equation for a response $Y_A$ as a function of five variable factors $x_1$—$x_5$ may be given as $$Y_A = a_0 + \sum_{i=1}^{5} a_i x_i + \sum_{i=1}^{5} a_{ii} x_i^2 + \sum_{i=1}^{4} \sum_{\substack{j=2 \\ j>i}}^{5} a_{ij} x_i x_j \quad (2)$$

Rewriting equation (2) in terms of changes from the base level value it would appear as:

$$\Delta Y_A = Y_A - a_0 = \Sigma a_i x_i + \ldots \quad (3)$$

where the coefficient $a_0$ is merely a constant representing the predicted value of response $Y_A$ at the base level ($x_i = o, i=1, \ldots 5$) and need not appear explicitly in the programming of the equation.

It should be apparent that 20 individual terms would be added on the right-hand side in order to complete equation (3). These would include five main effect terms having single subscript coefficients ($a_1 x_1, a_2 x_2 \ldots a_5 x_5$); five curvature terms having like subscript coefficients ($a_{11} x^2, a_{22} x_2^2 \ldots a_{55} x_5$); and 10 interaction terms having double unlike subscripts ($a_{12} x_1 x_2, a_{13} x_{13}, a_{45} x_4 x_5$).

Special second order model equations for seven other responses $Y_B$—$Y_H$ would appear in a form similar to equation (3), the only difference being the appearance of different constant influence coefficients as shown below:

$$Y_B = b_0 + \Sigma b_i x_i + \Sigma b_{ii} x_i^2 + \Sigma\Sigma b_{ij} x_{ij}$$
$$Y_C = c_0 + \Sigma c_i x_i + \Sigma c_{ii} x_i^2 + \Sigma\Sigma c_{ij} x_{ij}$$
$$Y_D = d_0 + \Sigma d_i x_i + \Sigma d_{ii} x_i^2 + \Sigma\Sigma d_{ij} x_{ij}$$
$$Y_E = e_0 + \Sigma e_i x_i + \Sigma e_{ii} x_i^2 + \Sigma\Sigma e_{ij} x_{ij} \quad (4)$$
$$Y_F = f_0 + \Sigma f_i x_i + \Sigma f_{ii} x_i^2 + \Sigma\Sigma f_{ij} x_{ij}$$
$$Y_G = g_0 + \Sigma g_i x_i + \Sigma g_{ii} x_i^2 + \Sigma\Sigma g_{ij} x_i x_j$$
$$Y_H = h_0 + \Sigma h_i x_i + \Sigma h_{ii} x_i^2 + \Sigma\Sigma h_{ij} x_{ij}$$

It should be apparent that the numerical values for the constant influence coefficient terms for the special model equations above can be determined by the known analytical techniques previously mentioned. Furthermore, once these coefficients have been calculated, evaluation of the special equations is more susceptible of the use of a special purpose analogue computer than a general purpose digital computer.

Figure 1:
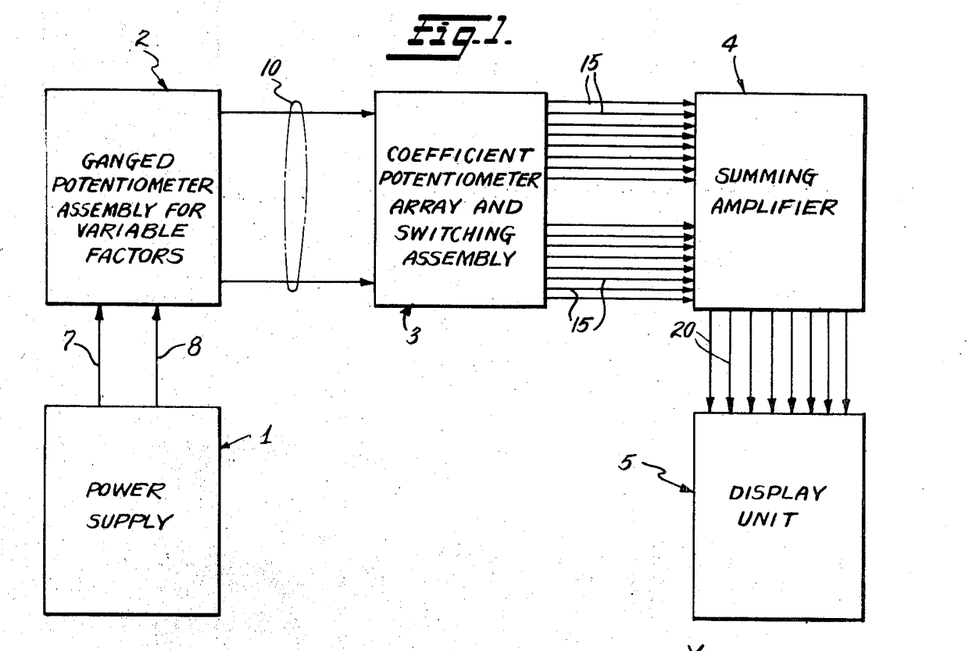
FIG. 1 is a block diagram of the special purpose analogue computer or blend optimizer of the present invention.

FIG. 1 shows a block diagram of a special purpose analogue computer designed to simultaneously evaluate the special model equations set forth above.

Referring now to FIG. 1 a block diagram of the special purpose computer or blend optimizer of the present invention is shown comprising a power supply 1, a ganged potentiometer assembly 2, a coefficient potentiometer array 3, a summing amplifier unit 4, and a display unit 5.

Power for the summing amplifier unit and display unit is furnished from the supply 1 on line 7. In addition, supply 1 provides positive DC reference potentials and negative DC reference potentials to the potentiometer assembly 2 via line 8.

Assembly 2 is comprised of a plurality of potentiometer gangs corresponding in number to the variable factors which are to be evaluated by the blend optimizer. Each potentiometer gang includes a front driver pot, which may be selectively energized with either a positive or a negative reference voltage, and one or more follower pots the settings of which are also controlled by operation of the driver pot shaft.

The ganged potentiometer assembly 2 is a means for multiplying the reference voltage by first determinable or predetermined values. This assembly 2 is arranged to develop first output voltages representative of the $x_i$, $x_i^2$ and $x_i x_j$ terms of equation (2) in a manner to be explained in detail in connection with FIGS. 4 and 5.

The coefficient potentiometer array 3 is comprised of a plurality of individually mounted and operated potentiometers, a single pot being provided for each influence coefficient of each model equation to be evaluated by the blend optimizer. For example, evaluation of a five variable response equation containing 20 terms would require 20 pots and an eight channel system for simultaneously evaluating eight such model equations would require 160 coefficient pots.

The output voltages from the pots of assembly 2 are furnished as inputs to the pots of array 3 along line 10. Each of the potentiometers of array 3 functions to multiply one of the voltages representing an $x_i$, $x_i^2$ or $x_i x_j$ term by a second determinable or predetermined value; namely, an influence coefficient as preset upon the dial of that coefficient pot. Thus, the output of a potentiometer of array 3 is a second output voltage which represents the absolute value of a particular term of one of the model equations being evaluated. Furthermore, the polarities of the output voltages from the pots of array 3 are predetermined to be positive or negative, as required to correspond with the sign of the terms they represent, in a manner to be further explained. The output voltages representing positive terms are automatically collected as positive output values by means of a sign switching assembly; while the output voltages representing negative terms are automatically collected as negative output values by the same means.

A pair of summing amplifiers are provided to receive outputs on lines 15 for each channel of the optimizer and are interconnected to combine the positive term voltages and the negative term voltages in proper relationship. The outputs of the respective pairs of summing amplifiers are then made available on a plurality of lines 20 to operate the display unit in a number of alternative modes.

Figure 2A:
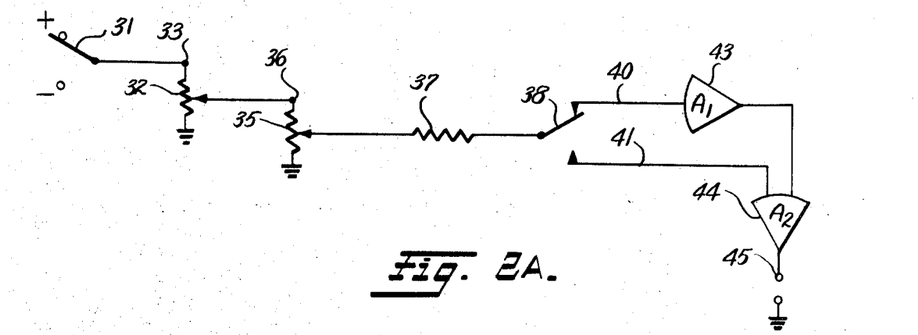
FIGS. 2A—2C are schematic diagrams of typical potentiometer connections utilized in the blend optimizer.
Figure 2B:
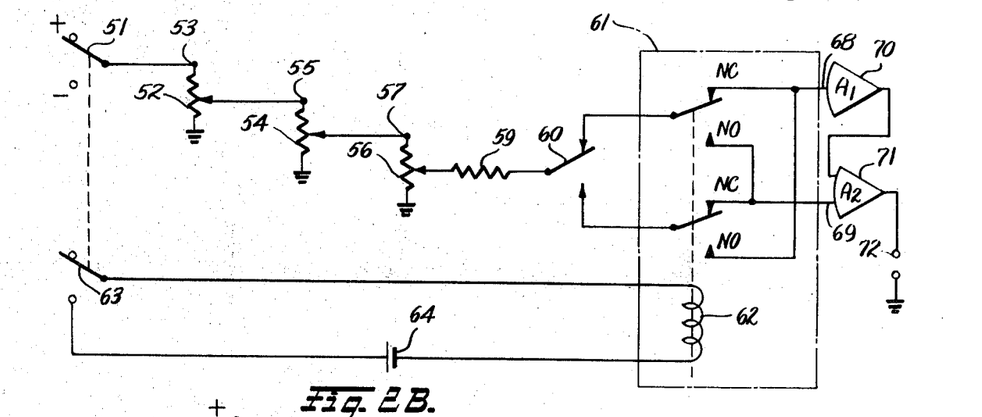
Figure 2C:
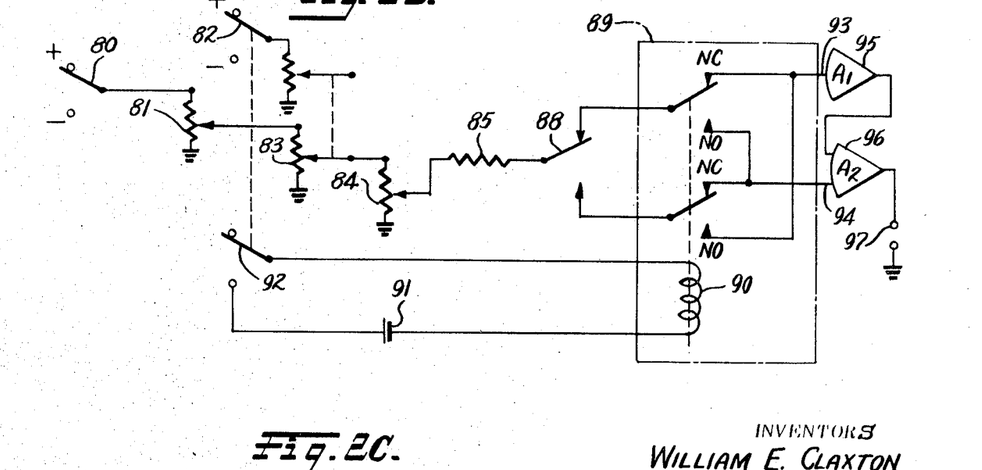

Referring now to FIGS. 2A—2C, typical circuits are shown for generating, respectively, voltages representative of the $x_i$ main effect terms, the $x_i^2$ curvature terms, and the $x_i x_j$ interaction terms.

FIG. 2A shows a toggle switch 31 which may be manually moved to an upper position to supply a positive reference potential to the input of potentiometer 32 in the event a positive value of $x_i$ is desired; or switch 31 may be moved to a lower position to supply a negative reference potential in the event a negative value of $x_i$ is selected. The movable wiper of potentiometer 32 is controlled by a dial and is positioned at a setting corresponding to a determinable or desired level of $x_i$. Accordingly, the voltage supplied to the input of potentiometer 35 is proportional to the selected value of $x_i$. The movable wiper of potentiometer 35 is also controlled by a dial and is positioned at a setting corresponding to the determinable or predetermined scaled value of the influence coefficient $a_i$ for the $x_i$ term. Consequently the voltage picked off at the slider terminal is proportional to the product of the settings of the dials or $a_i x_i$. This proportional voltage is applied to resistor 37 so that a current proportional to $a_i x_i$ flows through the resistor to a manually positioned toggle switch 38. The current flowing through resistor 37 is directed by toggle switch 38 either to an amplifier input bus 40 which collects currents representing positive terms or to an amplifier input bus 41 which collects currents representing negative terms. Thus, the position of toggle switch 38 is always set to a positive position if $a_i$ is positive and to a negative position if $a_i$ is negative.

A pair of summing amplifiers 43, 44 are interconnected as shown so that the polarities of the currents representing the positive and negative terms, as seen at the output, will be correctly determined by the positions of toggle switches 31 and 38. Thus, if $a_i$ and $x_i$ are both positive, a positive current will be collected on bus 40, inverted by amplifier 43, and inverted again by amplifier 44 whereby it will appear as a positive value at output terminal 45. If $a_i$ and $x_i$ are both negative, a negative current will be collected on bus 41 and inverted by amplifier 44 to appear at output terminal 45 as the proper positive value. If $x_i$ is negative and $a_i$ is positive, a negative current will be collected on bus 40 and inverted twice by amplifiers 43 and 44 to appear at the output as a negative value. Lastly, if $x_i$ is positive and $a_i$ is negative, a positive current would be collected on bus 41 and inverted by amplifier 44 to appear at the output 45 as a proper negative value.

Circuit 2B for generating a current proportional to an $a_{ii}x_i^2$ curvature term includes a toggle switch 51 adapted to connect the input 53 of potentiometer 52 to either a positive or a negative reference potential, depending as before upon the sign of the $x_i$ term. The wiper of potentiometer 52 is electrically connected as an input to potentiometer 54 at terminal 55.

Potentiometers 52 and 54 are ganged whereby their wipers are controlled by a single dial, positioned at a setting corresponding to a preselected level of $x_i$. Consequently the voltage picked off at the wiper of pot 54 is proportional to the value $x_i^2$. This voltage is presented in turn as an input to potentiometer 56. The movable wiper of potentiometer 56 is controlled by a dial which is positioned at a setting corresponding to the scaled predetermined value of $a_{ii}$. Thus, a voltage is presented to resistor 59 which is proportional to the product of $a_{ii}$ and $x_i^2$. This voltage causes a proportional current to flow through the resistor 59 to switch 60.

Switch 60 is a toggle switch which is manually set to an upper position if the sign of the $a_{ii}$ term is positive and to a lower position if the sign of $a_{ii}$ is negative. A pair of summing amplifiers 70, 71 are again interconnected with positive bus 68 and negative bus 69 so that the polarities of the positive and negative terms at the output 72 will be correctly determined by the positions of switches 51 and 60 and by relay 61.

Relay 61 is a double-pole double-throw relay having its contacts in an upper normally closed position when the relay coil 62 is deenergized. In that case, if $a_{ii}$ is positive the positive current through resistor 59 is collected on bus 68 and inverted twice by amplifiers 70, 71 to appear as a positive value at output 72. If $a_{ii}$ is negative, the positive current is collected on bus 69 and inverted only by amplifier 71 to appear as a negative value at the output 72.

On the other hand, if $x_i$ is negative the square of the $x_i$ will create a positive value for the term. In that case switch 51 will be moved to its lower position and will introduce a negative reference potential to pot 52. However, note that switch 63 will also be moved to its lower position, energizing coil 62 and moving the contacts of relay 61 to the NO contact positions. Thus, with relay 61 in an energized position and $a_{ii}$ positive, a negative current will flow through resistor 59, the upper terminal of switch 60, the upper NO contact of relay 61 and will be collected on negative bus 69. This current will then be inverted by amplifier 71 and will appear at output terminal 72 as having the proper positive value. With relay 61 in an energized position, if $a_{ii}$ is negative, the negative current through resistor 59 will flow through the lower terminal of switch 60, the lower NO terminal of relay 61 and will be collected on the positive bus 68. The negative current will then be inverted by each of amplifiers 70, 71 and will appear at the output as having the proper negative value.

Thus, relay 61 cooperates with switches 51 and 60 to form an automatic sign switching system ensuring that the currents representing the various terms of a model equation will be summed in the proper relationship at the output.

FIG. 2C shows a typical circuit for generating a current proportional to an $a_{ij}x_ix_j$ term which includes switch 80 adapted to connect the input of pot 81 to either a positive or a negative reference potential. The wiper of pot 81 is controlled by a dial positioned at a setting corresponding to a desired level of $x_i$. Thus, the voltage picked off at the wiper of pot 81 and supplied to pot 83 is proportional to $x_i$. The wiper of pot 83 is controlled by the dial of a second set of ganged pots and is positioned at a setting corresponding to a desired level of $x_j$. Accordingly a voltage proportional to the product of $x_i$ and $x_j$ is supplied to coefficient pot 84, the wiper of which is controlled by a dial positioned at the predetermined value of $a_{ij}$. It should be apparent that the current flowing through resistor 85 is thus proportional to the absolute value of the product $a_{ij}x_ix_j$. Toggle switch 88 is manually set to an upper position when $a_{ij}$ is positive and to a lower position when $a_{ij}$ is negative. Switch 82, associated with the gang of pots which includes follower pot 83 will also be manually set in an upper position when $x_j$ is positive and in a lower position when $x_j$ is negative. Automatic sign changing relay 89, shown in its unenergized position, is included for the same purpose as relay 61 in FIG. 2B. However, it should be noted that switch 92 in the power circuit of coil 90 is ganged to move in response to the positioning of switch 82 associated with the $x_j$ term potentiometer gang rather than in response to toggle switch 80.

It should be apparent that the arrangement of relay 89 and switches 82 and 88 will automatically switch the proportional currents to the appropriate bus whereby they will be summed in the proper relationship in the output signal. First of all assume that $x_j$ is positive, switch 82 is in an upper position, and relay 89 is deenergized. Then if $a_{ij}$ and $x_i$ are positive, a positive current will be collected on bus 93 inverted twice by amplifiers 95 and 96 to appear at the output as a positive value. If $a_{ij}$ and $x_i$ are both negative, a negative current will be collected on bus 94 and inverted once to assume the proper positive value at output 97. If $a_{ij}$ is positive and $x_i$ negative, a negative current will be collected on bus 93, and inverted twice by the summing amplifiers to appear at the output as a proper negative value. Finally, if $a_{ij}$ is negative and $x_i$ is positive, a positive current will be collected on bus 94 and inverted once to assume the proper negative value at output terminal 97.

Now assume that $x_j$ is negative and relay 89 is energized. If both $a_{ij}$ and $x_i$ are positive, a positive current will be collected on bus 94 and inverted once to assume the proper negative output polarity. If $a_{ij}$ and $x_i$ are both negative, a negative current will be collected on bus 93 and inverted twice to maintain the proper negative output polarity. If $x_i$ is negative and $a_{ij}$ positive, a negative current will be collected on bus 94 and inverted once to assume the proper positive output polarity. Finally, if $a_{ij}$ is negative and $x_i$ is positive, a positive current will be collected on bus 93 and inverted twice to assume the proper positive output polarity.

The circuits shown in FIGS. 2A—2C are capable of generating currents proportional to the three forms of mathematical terms included in a second order equation involving two or more variables. Consequently a preferred embodiment of the blend optimizer, utilizing various combinations of the above circuits can be constructed and will be described in connection with FIGS. 3—7.

Figure 3:
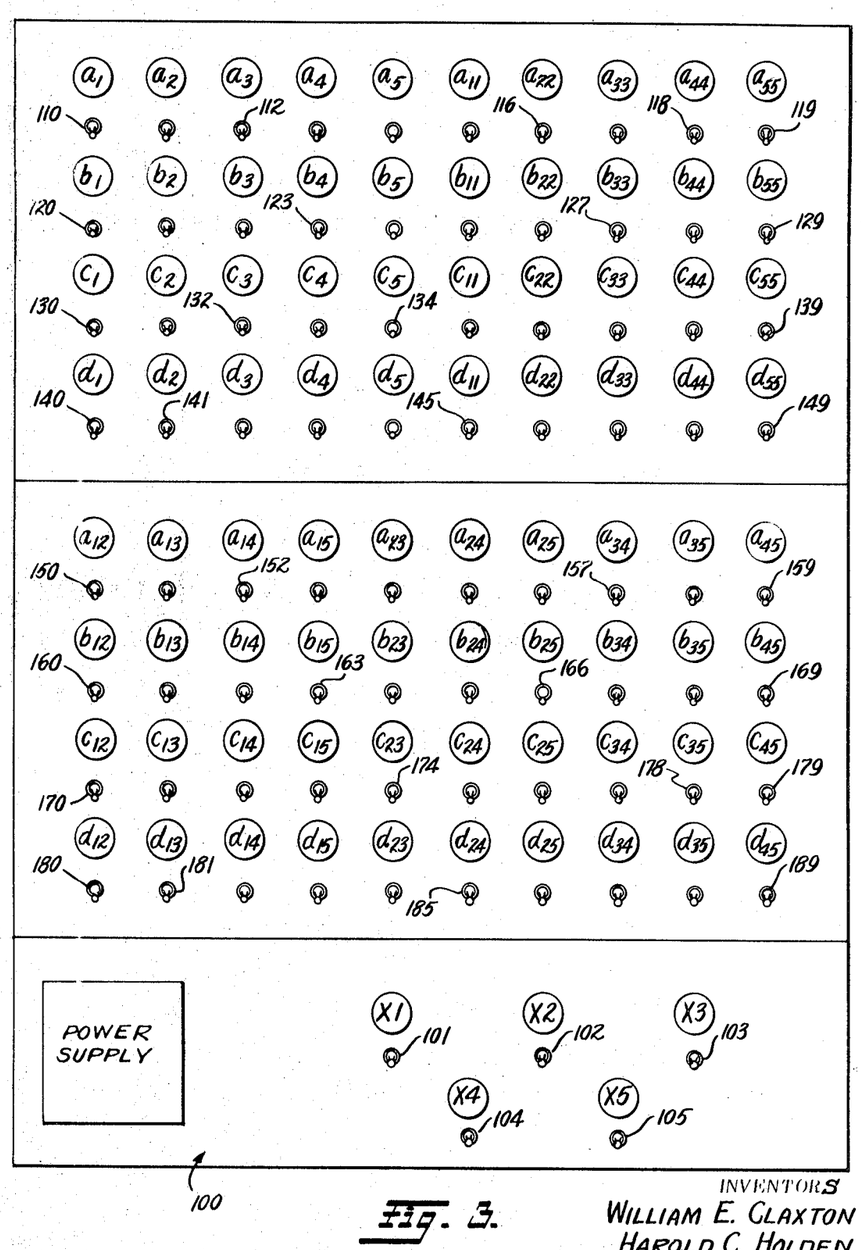
FIG. 3 is a diagrammatic view of a console, housing a coefficient potentiometer array and switching assembly as well as a ganged potentiometer assembly used in a preferred embodiment of the invention.

FIG. 3 shows a front view of a console 100 which houses the power supply, five ganged potentiometers of a variable factor assembly and 80 potentiometers of a coefficient potentiometer array. The console shown in FIG. 3 may be operated in conjunction with a summing amplifier unit and display unit, not shown, as a four channel optimizer. However, in actual practice a second identical console is interconnected with console 100 to function as a unified eight channel optimizer.

Five variable factor dials $x_1$—$x_5$ are shown at the bottom of the console upon which the desired factor values may be set, each dial being mounted above one of the two-pole toggle switches 101—105. Each variable factor dial is connected to and controls a rotatable shaft of a ganged potentiometer. Each ganged potentiometer is structurally comprised of a front pot and one or more stacked follower pots all controlled by the same shaft to assume identical positions. The individual potentiometers are all of a compact conventional type, each comprising a circular resistance coil surrounding the rotatable shaft. The shaft supports a separate wiper arm for each front and follower pot which arm contacts and sweeps across the turns of its corresponding coil as the shaft is rotated.

Eighty potentiometers of the coefficient potentiometer array are mounted in the console in banks of 10, located above the variable factor pot assembly. Each pot is similar to the front pot of one of the potentiometer gangs, comprising a wiper mounted upon a rotatable shaft whereby it may be swept in contact with the turns of a circular resistance coil. The shaft of each coefficient pot is provided with a dial as shown in FIG. 3. It should be apparent that the dial of each pot may be positioned at a value corresponding to a predetermined scaled value of the influence coefficient for one of the terms of a model equation. Consequently the voltage picked off by the wiper of each pot will be proportional to the product of the pot input voltage and the coefficient value set on the dial.

Since the model equations to be evaluated by the preferred blend optimizer include up to five variable factors and therefore 20 terms, a total of 20 potentiometers are provided in each of the four channels included in the console. Thus, the pots for the $a$ $a_{channel}$ include the top bank of $a_1-a_{55}$ pots as well as the fifth bank of $a_{12}-a_{45}$ pots.

Two-position toggle switches 110—189 are mounted, respectively, below the potentiometer dials and may be used to control the sign of the influence coefficient set upon each corresponding dial in the manner explained in connection with the circuits of FIG. 2.

Figure 4:
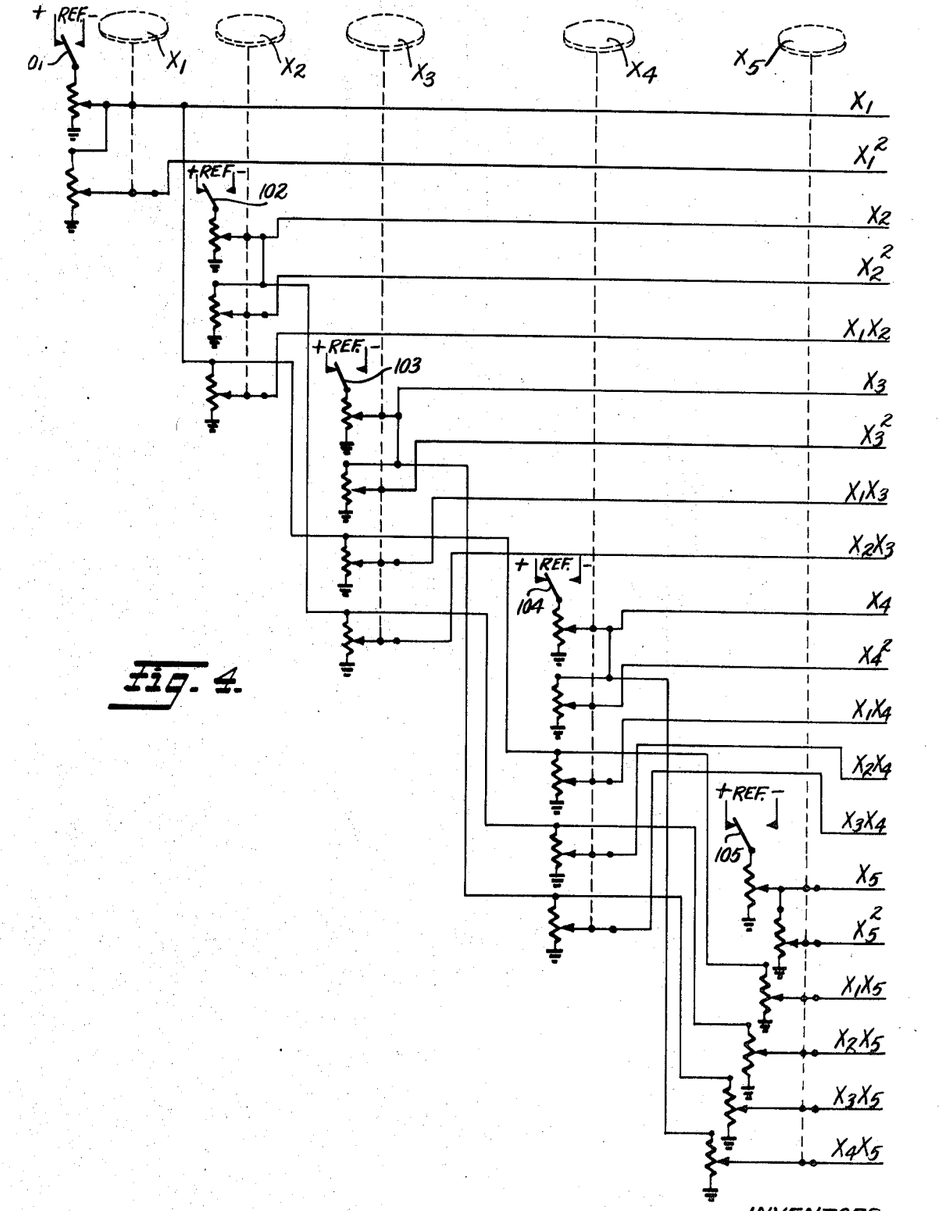
FIG. 4 is a partial schematic diagram of the ganged potentiometer assembly of the preferred embodiment of the invention.
Figure 5:
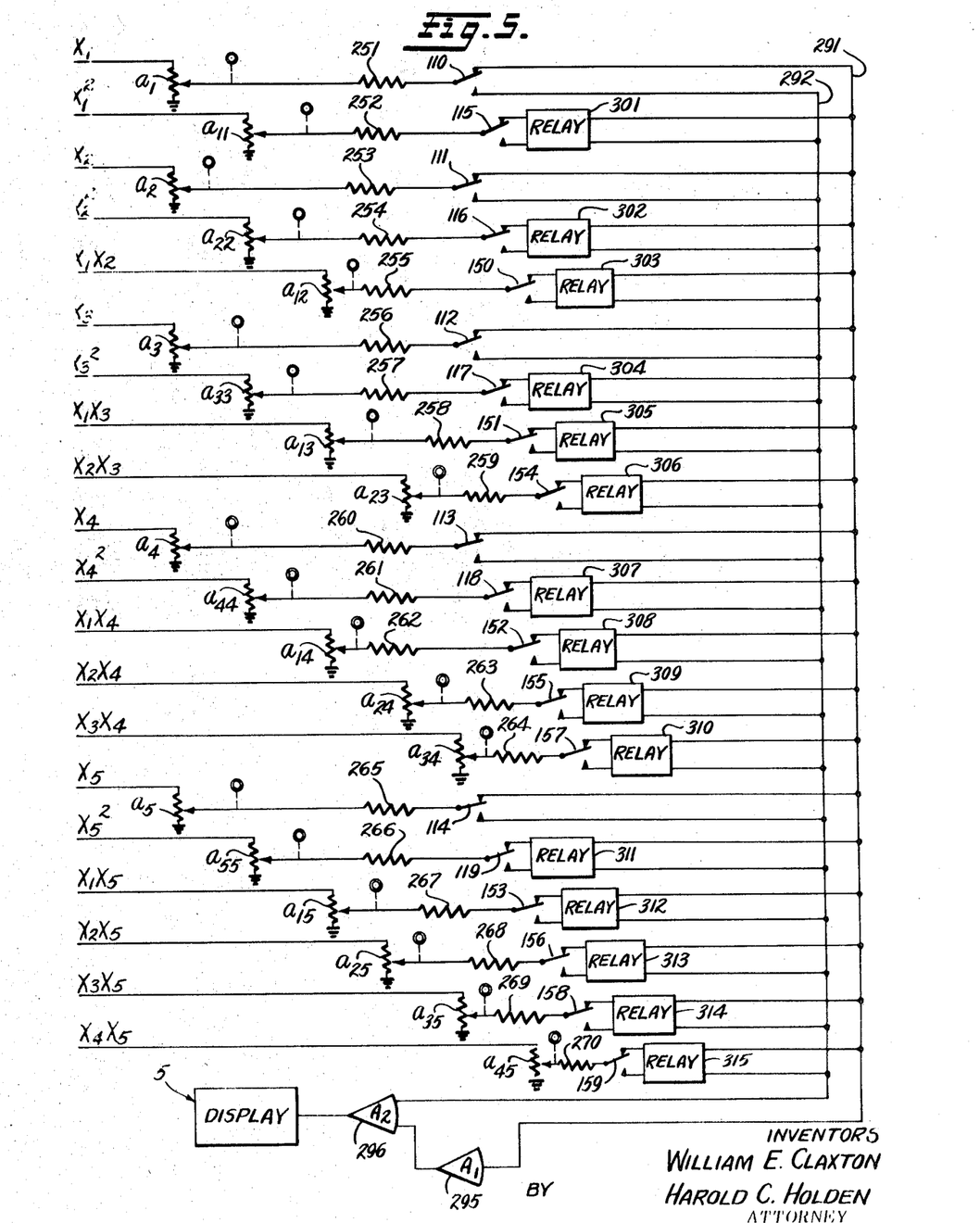
FIG. 5 is a partial schematic diagram which, taken in conjunction with FIG. 4, shows circuit details of a bank of coefficient potentiometers and switching relays of the preferred embodiment.

The electrical circuits interconnecting the front pots and follower pots of the ganged potentiometers $x_1-x_5$ as well as the circuits connecting the variable factor assembly with the $a$ channel pots of the influence potentiometer array are shown in schematic form in FIGS. 4 and 5. The actual wiring of the ganged potentiometers of the variable factor assembly is internal and therefore not shown in the front view of the console. In practice, however, the wiper voltages of the variable factor pots can be routed to binding posts on the potentiometer arrays, either in front of or behind the front panel of the console, where they are easily accessible for connection as inputs to the appropriate coefficient potentiometers. These binding posts may be patched to terminals on the front of the panel in the preferred embodiment but are not shown in FIG. 3.

In addition the automatic sign switching relays can, if desired, be mounted on the front of the console adjacent to their corresponding coefficient potentiometers. These relays, shown schematically in FIG. 5 are likewise not shown in FIG. 3.

Referring now to FIG. 4, the variable factor potentiometer gangs are shown in schematic. It should be apparent that the $x_1$ gang includes a front pot and one follower pot, while the other gangs each include a front pot and two or more follower pots. For example, the $x_3$ gang contains a front pot and three follower pots. The movable wipers of the front pot and follower pots of each gang are supported by a single shaft whereby they are swept in unison between the "zero" and "one" settings of their respective coils.

The input terminal of the front pot of each gang can be independently energized by either a positive or a negative reference potential from a source not shown by manually positioning one of the toggle switches 101—105. The "zero" end of each of the potentiometers is electrically grounded; while the wiper of each of the front pots is electrically connected as an input to its first follower pot. The wiper of the front $x_1$ pot is also electrically connected as an input to the second follower pot of each of the $x_2-x_4$ gangs. Likewise the wiper of the front $x_2$ pot is electrically connected as an input to the third follower pot of each of the $x_3-x_5$ gangs; the wiper of the front $x_3$ pot is electrically connected as an input to the fourth follower pot of each of the $x_4-x_5$ gangs; and the wiper of the front $x_4$ pot is electrically connected as an input to the fifth follower pot of the $x_5$ gang. In addition to the above, an output line is taken from the movable wiper of each of the front and follower pots, comprising a total of 20 outputs.

These outputs comprise the inputs to the influence coefficient potentiometers of the eight channels of the blend optimizer. For example, the connections for a single $a$ channel are shown in FIG. 5.

Referring now to FIG. 5, the influence potentiometer $a_1$ is arranged at the top of a vertical column of pots on the left side of the FIG. The $a_1$ pot is designed to develop a voltage proportional to the main effect term $a_1x_1$ of the model equation. Consequently this pot receives, as an input, the output line from the wiper of the front pot of the $x_1$ gang. The "zero" end of the $a_1$ pot is grounded and a circuit is available from its wiper through resistor 251 to switch 110. Switch 110 corresponds to the toggle switch mounted beneath the $a_1$ dial in FIG. 3 and is therefore manually moved to an upper position if $a_1$ is positive in order to direct the current flowing through resistor 251 to positive bus 291 feeding amplifier 295. If $a_1$ is negative, switch 110 is moved to a lower position in order to direct the current flowing through resistor 251 to negative bus 292 feeding amplifier 296. Similar circuits are provided for potentiometers $a_2-a_5$, designed to develop, respectively, voltages proportional to the main effect terms $a_2x_2 ... a_5x_5$ of the $Y_A$ model equation. It should be apparent that the circuit associated with each of these potentiometers is similar to that disclosed in FIG. 2A.

Influence potentiometer $a_{11}$ is arranged at the top of a second vertical row of pots in FIG. 5. The "zero" end of the $a_{11}$ pot is grounded and the wiper is controlled by the $a_{11}$ dial which is set at a position corresponding to the value of the $a_{11}$ influence coefficient. The $a_{11}$ pot receives an input signal from the wiper of the first follower pot of the $x_1$ gang and therefore develops an output voltage proportional to the curvature term $a_{11}x_1^2$ of the $Y_A$ model equation. An output circuit is provided from the $a_{11}$ wiper through resistor 252 and switch 115 to relay 301, the internal circuit details of which are similar to those of relay 61 in FIG. 2B. Relay 301 is energized only when toggle switch 101 is connected to a negative reference potential and functions to automatically control the polarity of the output signal in a manner previously explained. Similar circuits are provided for influence potentiometers $a_{22}-a_{55}$ in order to develop voltages proportional to the other curvature terms of the $Y_A$ model equation.

Influence potentiometer $a_{12}$ is arranged at the top of a third group of pots in FIG. 5. The "zero" end of the $a_{12}$ pot is grounded and the wiper is controlled by a dial which is set at a position corresponding to the value of the $a_{12}$ influence coefficient. The $a_{12}$ pot receives an input signal from the second follower pot of the $x_2$ gang and therefore develops an output voltage proportional to the interaction term $a_{12}x_1x_2$ of the $Y_A$ model equation. An output circuit is provided from the $a_{12}$ wiper through resistor 255 and switch 150 to relay 303, the internal circuit details and connections of which are similar to those of relay 89 in FIG. 2C. Thus, relay 303 is energized only when toggle switch 102 is connected to a negative reference potential and functions to automatically control the polarity of the output signal in a manner previously explained. Similar circuits are also provided for potentiometers $a_{13}-a_{45}$ in order to develop voltages proportional to the other interaction terms of the $Y_A$ model equations.

It should be noted that relays 304—306 are all controlled by switch 103; relays 307—310 are controlled by switch 104; and relays 311—315 are controlled by switch 105. The signals collected on positive bus 291 are all supplied as inputs to the amplifier 295. The output of amplifier 295 is supplied as one of two inputs to amplifier 296; the other input to amplifier 296 being the negative bus 292. The output of amplifier 296 therefore comprises an analogue signal which is proportional to the response $Y_A$ and may be used to drive the display device.

The manner in which the $Y_A$ model equation is set up for evaluation on the blend optimizer should now be apparent. Initially the scaled value of the $a_1$ coefficient is set on the $a_1$ dial and toggle switch 110 is moved to an upper position if the coefficient is positive. The remaining coefficients are set up in the same manner on dials $a_2-a_{45}$ and switches 111—119 and 150—159. When this is accomplished each of the variable factor dials $x_1-x_5$ is set at a position corresponding to a desired level of a variable factor. The switches 101—105 are each moved to the proper position determined by the polarity of the corresponding factor. With the appropriate values set on the variable factor and coefficient pot dials, the blend optimizer may be energized and the stabilized output voltage will be proportional to $Y_A$. The operator may then proceed to rotate the dials of the $x_1$—$x_5$ pots to simulate other combinations of factors and the corresponding values of $Y_A$ will be instantly computed and displayed at the output.

The proportional voltages which are developed at the outputs of the variable factor pots are shown on the 20 output lines on the right side of FIG. 4. The manner in which they are produced is believed apparent in view of the previous explanation of FIGS. 2A—2C. For example, the voltage proportional to $x_2$ is taken directly from the wiper of the front $x_2$ pot as controlled by the setting of the $x_2$ dial. Likewise, the voltage proportional to $x_3^2$ is taken from the wiper of the first follower pot of the $x_3$ gang as controlled by the setting of the $x_3$ dial. Finally, the voltage proportional to $x_4 x_5$ is taken from the wiper of the fifth follower pot of the $x_5$ gang as controlled by the settings of the $x_4$ and $x_5$ dials.

The variable factor assembly outputs are then multiplied by the appropriate influence coefficient value and collected on one of the output buses for summation.

Naturally, in the normal operation of the blend optimizer up to eight responses will be programmed for simultaneous solution; four on the coefficient potentiometer banks $a$—$d$ and the other four on banks $e$—$h$ contained in the console not shown. It should be noted that each of the arrays of coefficient potentiometers receive input signals from the pots on one variable factor assembly $x_1$—$x_5$. Once a complete set of responses are set up on the blend optimizer, the variable factor pots can be readjusted as desired and the corresponding values for all the responses read out simultaneously.

In the preferred embodiment reference potential levels of plus 10 volts DC and minus 10 volts DC were used. However, it should be apparent that any other suitable reference levels could be used as well.

In order to minimize inaccuracy in the output signals of the potentiometers due to loading errors, the resistances of the progressive stages of the potentiometers are increased. Thus, resistances of 100 ohms are utilized in the front pots and resistances of 10,000 ohms are used in the follower pots of the variable factor gangs; while resistances of 100,000 ohms are used in the coefficient potentiometers. Load resistors 251-—270 are all 1 meg ohm resistors.

Figures 6, 7:
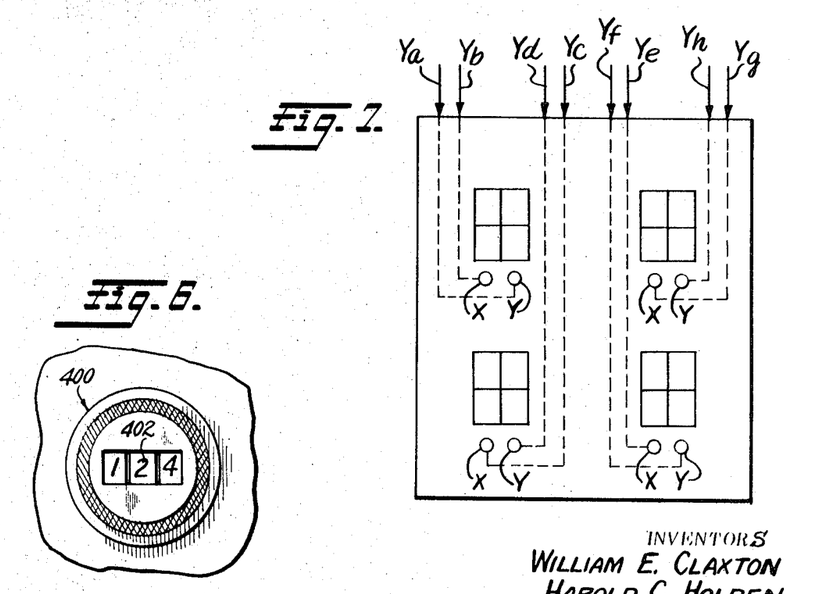
FIG. 6 is an enlarged view of a coefficient potentiometer dial.
FIG. 7 is a diagrammatic view of a display unit which may be used in connection with the blend optimizer of the present invention.

FIG. 6 shows an enlarged view of a typical potentiometer dial 400 including a three digit readout indicator 402 which may be used with good accuracy to position the wiper of the pot. However, if the best possible accuracy is necessary, the desired values may be set upon the influence potentiometer dials by using voltmeter balancing techniques.

The maximum calculated loading error in the eight channel blend optimizer utilizing the above resistance values and the optimal setup procedure would be in the range of 5 percent. This is a suitable accuracy for rubber compounding and for other uses of the invention within the rubber industry. However, it should be apparent that, at the sacrifice of greatly increased costs, better accuracy could be obtained if electronic multiplier elements such as quarter square multipliers with additional operational amplifiers were utilized in place of the potentiometer multipliers of the described embodiment. However the number of responses programmed with potentiometers using the present technique could be increased to at least 16 without substantially impairing the accuracy level set forth above.

In the preferred embodiment a 100 volt DC supply was used to energize the sign switching relays 301—315. Again, however, any other suitable level could be used, depending upon the relay coil requirements.

The amplifiers 295, 296 are high gain DC amplifiers of conventional design such as the Heathkit model EC-1 having 0-—100 volt input capacity and a gain of over 10,000.

Depending upon the particular application to which the present invention is being put a number of types of output display devices may be used. For example if it is desired to display or plot a first response $Y_A$ against a second response $Y_B$ an $x$—$y$ plotter of conventional design, such as the Electronic Associates, Inc. Variplotter 1110, can be conveniently used. The summing amplifiers and output display device can be mounted in the same console in any convenient manner.

A more sophisticated type of display system is shown in FIG. 7 which was designed to facilitate optimization studies. In the system shown four conventional oscilloscopes are supported by a console, arranged in a symmetrical array. Four of the eight response signals $Y_A$, $Y_C$, $Y_E$, $Y_G$ from the blend optimizer are used respectively, to drive the $x$ inputs of the oscilloscopes; while the remaining signals $Y_B$, $Y_D$, $Y_F$, $Y_H$ are used to drive the $y$ inputs. The display is programmed so that the beams of the four oscilloscopes converge toward the center of the display as an ideal blend is approached. This enables an operator to easily and rapidly adjust the variable factor dials to achieve optimization.

In addition to use in solving model equations and plural factor optimization studies the analogue computer of the present invention can be applied in various other ways. For example it can be used for random factor optimization studies. This could be accomplished by driving the factor level dials at different, continuous rates of rotation whereby all factor combinations could be swept out in a given time period. The predicted responses of all factor combinations could be recorded or monitored with logic circuits to detect those responses which fall within a range of interest.

In addition to the above equal response contour plots can easily be made using the apparatus of the present invention. This can be accomplished by applying voltages from the selected factor pots to the $x$ and $y$ inputs, respectively, of an $x$-—$y$ plotter. Then the appropriate read out amplifier output is maintained constant while the selected variable factor pots are alternately changed to plot the desired contours.

We claim:

1. An analogue computer for calculating the value of a second order equation for selected combinations of levels of variable factors of said equation, including:
   a source of reference voltages;
   a first plurality of means for multiplying said reference voltages, respectively, by scaled values representing the levels of said variable factors to produce a first plurality of voltages proportional to said levels;
   means for combining said first plurality of voltages in predetermined sets to produce a second plurality of voltages proportional to the variable factor terms of said equation;
   a second plurality of means for multiplying said second plurality of voltages, respectively, by scaled values which correspond to a set of unique influence coefficients to said variable factor terms to produce a plurality of response voltages proportional to the product of the variable factor terms and their respective influence coefficients;
   amplifier means for summing said response voltages to produce an analogue output; and
   display means connected to said amplifier means.

2. An analogue computer for simultaneously calculating the values of a plurality of second order equations for selected combinations of levels of variable factors common to all of said equations, including:
   a source of reference voltages;
   a first plurality of potentiometer means for multiplying said reference voltages, respectively, by scaled values representing the levels of said variable factors to produce a first plurality of voltages proportional to said levels;
   means for combining said first plurality of voltages in predetermined sets to produce a second plurality of voltages proportional to the portions of the variable factor terms common to all said equations;

a second plurality of potentiometer means subdivided into banks which are connected to outputs of said combining means, each said bank of potentiometer means multiplying said second plurality of voltages, respectively, by scaled values which correspond to a set of unique influence coefficients to the factor terms of said equations, to produce a plurality of response voltages proportional to the product of the variable factor terms and their respective influence coefficients;

amplifier means for each said bank of potentiometer means to sum the response voltages from said bank and produce an analogue output; and display means connected to said amplifier means.

3. An analogue computer comprising:

a positive voltage source connected to a first terminal of a single-pole double-throw switch and a negative voltage source connected to the other terminal of said switch;

a first potentiometer having an end terminal connected to the movable arm of said switch whereby said potentiometer may be selectively connected to either of said sources, the other end of said potentiometer being connected to a point of reference potential;

a second potentiometer having an end terminal connected to a movable contact of said first potentiometer and the other end connected to said point of reference potential;

a third potentiometer having one end connected to a movable contact of said second potentiometer and the other end connected to a point of reference potential;

a resistor having one end connected to a movable contact of said third potentiometer and the other end connected to the movable arm of a second single-pole double-throw switch;

an upper terminal of said second switch being connected to an upper movable arm of a double-pole double-throw relay and a lower terminal of said second switch being connected to a lower movable arm of said relay;

means connected to said first switch for energizing the coil of said relay when said first potentiometer is connected to said negative source;

a positive output bus connected to a normally closed terminal of the upper movable arm of said relay and a normally open terminal of the lower movable arm of said relay, a negative output bus connected to a normally open terminal of the upper movable arm of said relay and a normally closed terminal of the lower movable arm of said relay;

a first summing amplifier having an input connected to said positive bus, a second summing amplifier having a first input connected to an output of said first summing amplifier and a second input connected to said negative bus; and a display device connected to the output of said second amplifier.

4. An analogue computer comprising:

a positive voltage source connected to a first terminal of a single-pole double-throw switch and a negative voltage source connected to the other terminal of said switch;

a first potentiometer having an end terminal connected to the movable arm of said switch whereby said potentiometer may be selectively connected to either of said sources, the other end of said potentiometer being connected to a point of reference potential;

a second potentiometer having one end connected to a movable contact of said first potentiometer and the other end connected to said point of reference potential;

a third potentiometer having one end connected to a movable contact of said second potentiometer and the other end connected to a point of reference potential;

a resistor having one end connected to a movable contact of said third potentiometer and the other end connected to the movable arm of a second single-pole double-throw switch;

an upper terminal of said switch being connected to an upper movable arm of a double-pole double-throw relay and a lower terminal of said second switch being connected to a lower movable arm of said relay;

means associated with said second potentiometer for selectively energizing the coil of said relay;

a positive output bus connected to a normally closed terminal of the upper movable arm of said relay and a normally open terminal of the lower movable arm of said relay, a negative output bus connected to a normally open terminal of the upper movable arm of said relay and a normally closed terminal of the lower movable arm of said relay;

a first summing amplifier having an input connected to said positive bus, a second summing amplifier having a first input connected to an output of said first summing amplifier and a second input connected to said negative bus; and a display device connected to the output of said second amplifier.

5. An analogue computer comprising:

a positive voltage source connected to a first terminal of a single-pole double-throw switch and a negative voltage source connected to the other terminal of said switch;

a first potentiometer having an end terminal connected to the movable arm of said switch whereby said potentiometer may be selectively connected to either of said sources, the other end of said potentiometer being connected to a point of reference potential;

a second potentiometer having an end terminal connected to a movable contact of said first potentiometer and the other end connected to said point of reference potential;

a resistor having one end connected to a movable contact of said second potentiometer and the other end connected to the movable arm of a second single-pole double-throw switch;

an upper terminal of said second switch being connected to a positive output bus and a lower terminal of said second switch being connected to a negative output bus;

a first summing amplifier having an input connected to said positive bus, a second summing amplifier having a first input connected to an output of said first summing amplifier and a second input connected to said negative bus; and a display device connected to the output of said second amplifier.

6. An analogue computer including:

a source of reference potential;

means for multiplying said reference potential by a first determinable value in order to produce a first output voltage proportional to said value;

means for multiplying said first output voltage by a second determinable value in order to produce a second output voltage proportional to the product of said first and second values;

means receiving said second output voltage for producing an output current proportional to said second output voltage; and summing amplifier means receiving and amplifying said output current.

7. An analogue computer including:

a source of reference potential;

means for multiplying said reference potential by a first determinable value in order to produce a first output voltage proportional to said value;

means for multiplying said first output voltage by said first determinable value in order to produce a second output voltage proportional to the square of said first value;

means for multiplying said second output voltage by a second determinable value in order to produce a third output voltage proportional to the product of the square of said first value and said second value;

means receiving said third output voltage for producing an output current proportional to said third output voltage; and summing amplifier means receiving and amplifying said output current.

8. An analogue computer including:

a source of reference potential;

means for multiplying said reference potential by a first determinable value in order to produce a first output voltage proportional to said first value;

means for multiplying said first output voltage by a second determinable value in order to produce a second output voltage proportional to the product of said first and second values;

means for multiplying said second output voltage by a third determinable value in order to produce a third output voltage proportional to the product of said first, second and third values;

means receiving said third output voltage for producing an output current proportional to said third output voltage; and summing amplifier means receiving and amplifying said output means.

9. An analogue computer as described in claim 2 wherein an oscilloscope display device is provided for each pair of response voltages, one of each said pair of voltages being connected to the $x$ axis input of its corresponding display device and the other of said pair of voltages being connected to the $y$ axis input of said display device.

UNITED STATES PATENT OFFICE
CERTIFICATE OF CORRECTION

Patent No. 3,560,725                    Dated February 2, 1971

Inventor(s) William E. Claxton et al.

It is certified that error appears in the above-identified patent and that said Letters Patent are hereby corrected as shown below:

Column 3, line 31, the equation should appear as shown below:

$$\Delta Y_A = Y_A - a_o = \Sigma a_i x_i$$

line 39, the equation should appear as shown below:

$$(a_1 x_1, a_2 x_2 \ldots a_5 x_5)$$

line 40, the equation should appear as shown below:

$$(a_{11} x_1^2, a_{22} x_2^2 \ldots a_{55} x_5^2)$$

lines 41 and 42, the equation should appear as shown below $$(a_{12} x_1 x_2, a_{13} x_1 x_3, \ldots a_{45} x_4 x_5)$$

same column 3, lines 48 through 54, equation 4 should appear shown below:

$$Y_B = b_o + \Sigma b_i x_i + \Sigma b_{ii} x_i^2 + \Sigma\Sigma b_{ij} x_i x_j$$
$$Y_C = c_o + \Sigma c_i x_i + \Sigma c_{ii} x_i^2 + \Sigma\Sigma c_{ij} x_i x_j$$
$$Y_D = d_o + \Sigma d_i x_i + \Sigma d_{ii} x_i^2 + \Sigma\Sigma d_{ij} x_i x_j$$
$$Y_E = e_o + \Sigma e_i x_i + \Sigma e_{ii} x_i^2 + \Sigma\Sigma e_{ij} x_i x_j \quad ----\quad (\ $$
$$Y_F = f_o + \Sigma f_i x_i + \Sigma f_{ii} x_i^2 + \Sigma\Sigma f_{ij} x_i x_j$$
$$Y_G = g_o + \Sigma g_i x_i + \Sigma g_{ii} x_i^2 + \Sigma\Sigma g_{ij} x_i x_j$$
$$Y_H = h_o + \Sigma h_i x_i + \Sigma h_{ii} x_i^2 + \Sigma\Sigma h_{ij} x_i x_j$$

Signed and sealed this 5th day of February 1974

(SEAL)
Attest:

EDWARD M. FLETCHER, JR.
Attesting Officer

RENE D. TEGTMEYER
Acting Commissioner of P